(12) United States Patent (10) Patent No.: US 12,568,055 B2

Wang et al. (45) Date of Patent: Mar. 3, 2026

(54) DATA CACHING METHOD AND APPARATUS, MEDIUM AND NETWORK EQUIPMENT

(71) Applicant: BEIJING VOLCANO ENGINE TECHNOLOGY CO., LTD., Beijing (CN)

(72) Inventors: Bin Wang, Beijing (CN); Yaobao Wang, Beijing (CN); Yong Yuan, Beijing (CN); Shangyu Lu, Beijing (CN); Xuechao Wei, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 127 days.

(21) Appl. No.: 18/650,455

(22) Filed: Apr. 30, 2024

(65) Prior Publication Data

US 2024/0372820 A1 Nov. 7, 2024

(30) Foreign Application Priority Data

May 6, 2023 (CN) .......................... 202310506449.4

(51) Int. Cl.
H04L 49/90 (2022.01)
H04L 49/9047 (2022.01)
(52) U.S. Cl.
CPC ...... H04L 49/9036 (2013.01); H04L 49/9052 (2013.01)
(58) Field of Classification Search
CPC . H04L 49/9036; H04L 49/9052; H04L 49/90; H04L 49/9047; G06F 12/0893

USPC .......................................................... 709/224
See application file for complete search history.

(56) References Cited

U.S. PATENT DOCUMENTS 8,862,814 B2 * 10/2014 Chetlur .................. H04L 65/00
711/113
9,720,603 B1 8/2017 Salazar et al.
2014/0258595 A1 9/2014 Venkatesha et al.
(Continued)

FOREIGN PATENT DOCUMENTS

CN 1622524 A 6/2005

OTHER PUBLICATIONS

European Patent Office, Extended European Search Report Issued in Application No. 24173654.5, Aug. 30, 2024, 8 pages.

*Primary Examiner* — Adil Ocak
(74) *Attorney, Agent, or Firm* — Alleman Hall LLP

(57) ABSTRACT

A data caching method comprises: receiving message data returned by a second device in response to a read command; dividing the message data into two paths of data according to a preset strategy, sending one of the two paths of data to a first random access memory for storage, and distributing the other path to a double data rate synchronous dynamic random access memory for storage through a first input first output queue, wherein a sum of a working bandwidth of the first random access memory and a working bandwidth of the double data rate synchronous dynamic random access memory is greater than or equal to a receiving bandwidth of the message data; and sending data stored in the first random access memory and data stored in the double data rate synchronous dynamic random access memory to a first device connected with network equipment.

20 Claims, 5 Drawing Sheets

(56) References Cited

U.S. PATENT DOCUMENTS

| | | |
|---|---|---|
| 2021/0373951 A1 | 12/2021 | Malladi et al. |
| 2024/0070015 A1* | 2/2024 | Del Gatto .......... G06F 11/1076 |

* cited by examiner

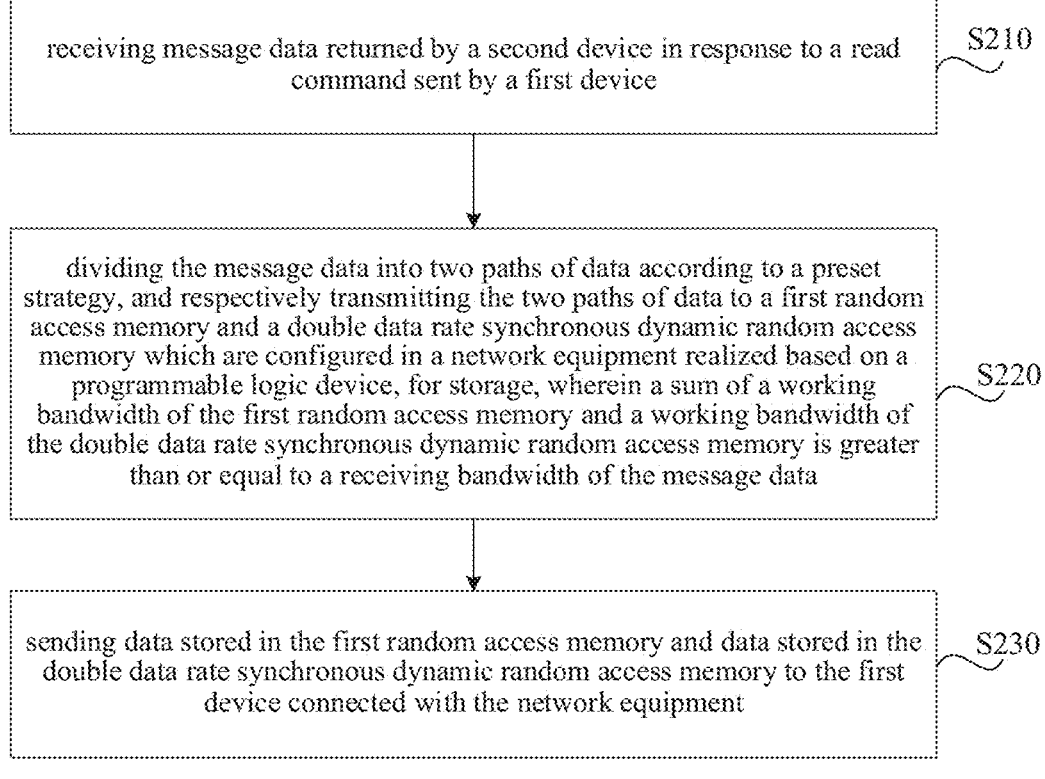

receiving message data returned by a second device in response to a read command sent by a first device — S210 dividing the message data into two paths of data according to a preset strategy, and respectively transmitting the two paths of data to a first random access memory and a double data rate synchronous dynamic random access memory which are configured in a network equipment realized based on a programmable logic device, for storage, wherein a sum of a working bandwidth of the first random access memory and a working bandwidth of the double data rate synchronous dynamic random access memory is greater than or equal to a receiving bandwidth of the message data — S220 sending data stored in the first random access memory and data stored in the double data rate synchronous dynamic random access memory to the first device connected with the network equipment — S230

FIG. 2

DATA CACHING METHOD AND APPARATUS, MEDIUM AND NETWORK EQUIPMENT

CROSS-REFERENCE TO RELATED APPLICATIONS

The present application is based on and claims the priority to the Chinese patent application No. 202310506449.4 filed on May 6, 2023, the disclosure of which is incorporated herein by reference in its entirety.

TECHNICAL FIELD

The present disclosure relates to the field of electronic information technologies, and in particular, to a data caching method and apparatus, medium, and network equipment.

BACKGROUND

In a network environment, there are scenes which are not long in duration but have large burst traffic, under which scenes loss of data packets easily occurs, so that how to avoid the loss of data packets when the traffic bursts has become a problem to be solved.

SUMMARY

The SUMMARY is provided to introduce concepts in a simplified form that are further described below in the DETAILED DESCRIPTION. This SUMMARY is not intended to identify key features or essential features of claimed technical solutions, nor is it intended to be used to limit the scope of the claimed technical solutions.

In a first aspect, the present disclosure provides a data caching method, comprising:

receiving message data returned by a second device in response to a read command sent by a first device;

dividing the message data into two paths of data according to a preset strategy, and respectively transmitting the two paths of data to a first random access memory and a double data rate synchronous dynamic random access memory which are configured in a network equipment realized based on a programmable logic device, for storage, wherein a sum of a working bandwidth of the first random access memory and a working bandwidth of the double data rate synchronous dynamic random access memory is greater than or equal to a receiving bandwidth of the message data; and sending data stored in the first random access memory and data stored in the double data rate synchronous dynamic random access memory to the first device connected with the network equipment.

In a second aspect, the present disclosure provides a data caching apparatus, comprising:

a receiving module, configured to receive message data returned by a second device in response to a read command sent by a first device;

a distributing module, configured to divide the message data into two paths of data according to a preset strategy, and respectively transmit the two paths of data to a first random access memory and a double data rate synchronous dynamic random access memory which are configured in a network equipment realized based on a programmable logic device, for storage, wherein a sum of a working bandwidth of the first random access memory and a working bandwidth of the double data rate synchronous dynamic random access memory is greater than or equal to a receiving bandwidth of the message data; and a sending module, configured to send data stored in the first random access memory and data stored in the double data rate synchronous dynamic random access memory to the first device connected with the network equipment.

In a third aspect, the present disclosure provides a computer readable medium having stored thereon a computer program which, when executed by a processing means, performs the steps of the method in the first aspect.

In a fourth aspect, the present disclosure provides a network equipment, comprising a processing means and an interface; the processing means configured to read instructions to perform the steps of the method in the first aspect.

Additional features and advantages of the present disclosure will be set forth in the DETAILED DESCRIPTION which follows.

BRIEF DESCRIPTION OF THE DRAWINGS

The above and other features, advantages, and aspects of embodiments of the present disclosure will become more apparent by referring to the following DETAILED DESCRIPTION when taken in conjunction with the accompanying drawings. Throughout the drawings, the same or similar reference numbers refer to the same or similar elements. It should be understood that the drawings are schematic and that elements and components are not necessarily drawn to scale. In the drawings:

FIG. 2 is a flowchart illustrating a data caching method according to an exemplary embodiment of the present disclosure.

DETAILED DESCRIPTION

Figure 1:
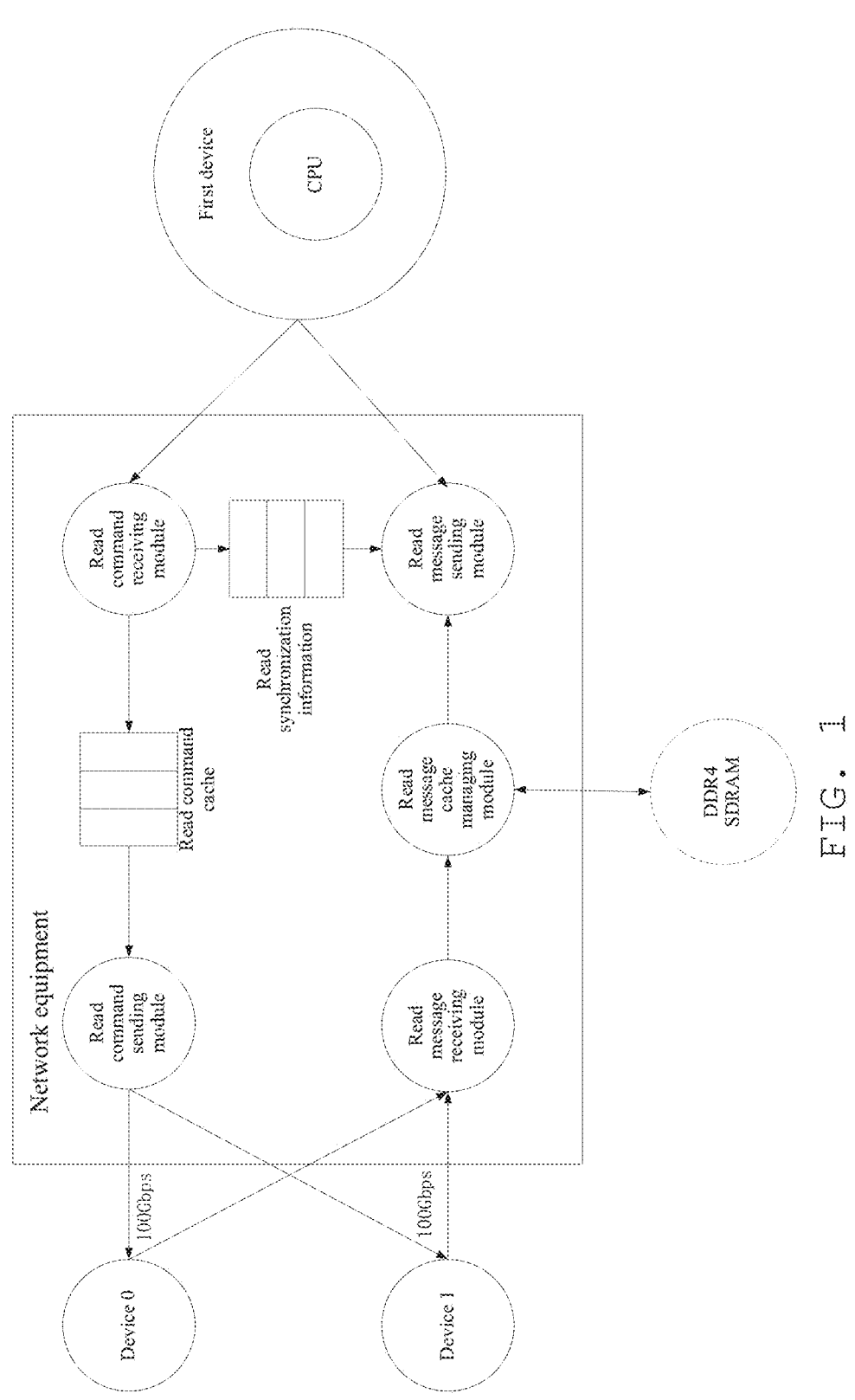
FIG. 1 is a schematic diagram illustrating an exemplary scenario according to an exemplary embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein, but rather these embodiments are provided for a more complete and thorough understanding of the present disclosure. It should be understood that the drawings and the embodiments of the present disclosure are for illustration purposes only and are not intended to limit the scope of the present disclosure.

It should be understood that the various steps recited in method embodiments of the present disclosure may be performed in a different order, and/or performed in parallel. Moreover, the method embodiments may include additional steps and/or omit performing the illustrated steps. The scope of the present disclosure is not limited in this respect.

The term "including" and variations thereof as used herein are intended to be open-ended, i.e., "including but not limited to". The term "based on" is "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that the terms "first", "second", and the like in the present disclosure are only used for distinguishing different devices, modules or units, and are not used for limiting the order or interdependence of the functions performed by the devices, modules or units.

It is noted that references to "a" or "an" in this disclosure are intended to be illustrative rather than limiting, and that those skilled in the art will appreciate that they should be understood as "one or more" unless the context clearly indicates otherwise.

The names of messages or information exchanged between devices in the embodiments of the present disclosure are for illustrative purposes only, and are not intended to limit the scope of the messages or information.

It is understood that, before the technical solutions disclosed in the embodiments of the present disclosure are used, the user should be informed of the type, use range, use scene, etc. of personal information involved in the present disclosure in a proper manner according to the relevant laws and regulations, to obtain the authorization of the user.

For example, in response to receiving a user's active request, prompt information is sent to the user to explicitly prompt the user that the requested operation to be performed would require acquisition and use of personal information of the user. Thus, the user can autonomously select whether to provide the personal information to software or hardware such as an electronic device, an application, a server, or a storage medium that performs the operations of the technical solution of the present disclosure, according to the prompt information.

As an alternative but non-limiting implementation, the sending prompt information to the user in response to receiving an active request from the user, may be, for example, a pop-up window, in which the prompt information may be presented in a text manner. In addition, a selection control for providing personal information to an electronic device by the user's selection of "agree" or "disagree" can be carried in the pop-up window.

It is understood that the above notification and user authorization process is only illustrative and is not intended to limit the implementation of the present disclosure, and other ways of satisfying the relevant laws and regulations may be also applied to the implementation of the present disclosure.

At the same time, it is understood that the data involved in the present disclosure (including but not limited to the data itself, the acquisition or use of the data) should comply with the requirements of the relevant laws and regulations and related provisions.

According to the technical solution of the present disclosure, a network equipment receives message data returned by a second device in response to a read command sent by a first device, divides the message data into two paths of data according to a preset strategy, respectively transmits the two paths of data to a first random access memory and a double data rate synchronous dynamic random access memory which are configured in the network equipment realized based on a programmable logic device, for storage, and sends data stored in the first random access memory and data stored in the double data rate synchronous dynamic random access memory to the first device. By sharing an entrance bandwidth pressure of the double data rate synchronous dynamic random access memory using a bandwidth of the first random access memory, the problem of insufficient receiving bandwidth of the double data rate synchronous dynamic random access memory is solved, and the packet loss possibility of the message data of the network equipment is reduced.

Reference is now made to FIG. 1, which is a schematic diagram illustrating scenario according to an embodiment of the present disclosure. As shown in FIG. 1, a Central Processing Unit (CPU) in a first device may issue a read command for reading an externally connected second device, where the read command may be sent to the externally connected second device through a connected network equipment, and after receiving the read command, the externally connected second device may return response message data to the CPU through the network equipment. There may be one or more externally connected second devices, and FIG. 1 illustrates two second devices with serial numbers of 0 and 1 as an example.

In some implementations, the network equipment can be, for example, a network card.

In some implementations, the network equipment may be a network equipment realized based on a Field Programmable Gate Array (FPGA), that is, the network equipment may include a programmable logic device.

Alternatively, the network equipment may be connected to the CPU through a 128 Gbps PCIE (peripheral component interconnect express, which is a high speed serial computer extended bus standard) interface, and the network equipment may be connected to the external second device through two Ethernet interfaces CGMAC with a rate of 100 Gbps.

It can be understood that, there is a time delay from when the CPU issues a read command, to when the second device returns response message data corresponding to the read command, and depending on a difference between different read commands, the maximum time delay of the response message data returned by the second device may reach 1.2 ms; due to presence of the delay, a large amount of response message data may reach a receiving interface of the network equipment at a certain time point at the same time, resulting in a large amount of traffic bursts.

For example, the network equipment may receive 200 Gbps burst traffic from the devices 0 and 1 in a short time, and at this time, the network equipment needs to absorb the burst traffic, cannot drop packets, and forwards the message data to the CPU after receiving the packets.

In some implementations, as shown in FIG. 1, a read command receiving module stores received read command information into a read command cache, and at the same time also writes the received read command information into a read synchronization information cache, so that it can be in a one-to-one correspondence with the read-returned message data in the future, and finally the synchronization information and the read message data are combined and returned to the CPU.

The second device returns a response to the CPU after receiving the read command, the message data enters the cache and is subjected to cache management; the read messages will be returned out of order due to the device, so that the messages in the cache can be read out according to the read synchronization information and sent to the CPU in an order-preserving manner. The order-preserving can be understood as that a serial number is transmitted among the CPU, the network equipment, and the second device, to ensure that the read synchronization information and the read-returned message data can be in one-to-one correspondence.

Before describing the embodiments of the present disclosure in detail, resources and system specifications configured in the network equipment realized based on a programmable logic device in some implementations, are described first.

In some implementations, the network equipment may include logic resources such as a Double Data Rate Synchronous Dynamic Random Access Memory (DDR SDRAM) interface, a first Random Access Memory (RAM), a Block RAM (BRAM), a register, and a lookup table.

Alternatively, the Double Data Rate Synchronous Dynamic Random Access Memory may be a DDR4 SDRAM (Double-Data-Rate Fourth Generation Synchronous Dynamic Random Access Memory). Alternatively, a bit width of the DDR4 SDRAM interface is 64 bit, an interface frequency thereof is 2666 MHZ, a capacity thereof is 1 GBytes, an effective bandwidth of the DDR4 SDRAM interface is about 160 Gbps, the DDR4 SDRAM bandwidth is shared by reading and writing, and the reading and the writing are mutually exclusive.

Alternatively, the first random access memory may be various. For a network equipment formed by Intel programmable logic devices, the first random access memory may be an Enhanced Static Random-Access Memory (eSRAM), and for a network equipment formed by xilinx programmable logic devices, the first random access memory may be an UltraRAM (Uram).

Alternatively, a bit width of the eSRAM interface is 256 bits, an interface frequency thereof is 260 MHZ, a capacity thereof is 2 MBytes, an effective bandwidth of the eSRAM interface is about 60 Gbps, the reading and the writing of the eSRAM interface bandwidth is separated, and the reading and the writing are not affected mutually and both can reach 60 Gbps bandwidth.

Alternatively, a size of the BRAM is 20 Kbit, which may be instantiated as 32 bit wide, and by multi-block splicing, 1024 bit wide or more may be achieved, and by splicing, a capacity of the BRAM also increases with the number of splices. Exemplarily, the bandwidth of the 1 Kbit wide BRAM interface can be about 260 Gbps, and the reading and the writing of the BRAM are not affected mutually and both can reach 260 Gbps bandwidth.

In some implementations, the read synchronization information cache inside the network equipment has a size of 32K read commands. The data read back by each read command may be a fixed 4 KB-sized message. Therefore, the maximum possible capacity of the messages that the network equipment can cache is 32K*4 KB=128 MBytes. The network equipment can work at 260 MHZ main frequency.

In combination with the foregoing, in a scenario of large burst traffic, that is, in a scenario where a received bandwidth is greater than a bandwidth of an interface of a double data rate synchronous dynamic random access memory, for example, when it is needed to receive burst traffic of 200 Gbps bandwidth, a problem of packet loss may occur because the double data rate synchronous dynamic random access memory cannot receive the 200 Gbps bandwidth; in the related art, 256 BRAMs are spliced into a 1024 bit width, so that the spliced random access memory can support an entry bandwidth of 260 Gbps, to receive the burst traffic through the spliced BRAMs, and then the burst traffic received by the BRAMs is stored in the double data rate synchronous dynamic random access memory.

However, the applicant found in long-term research that, although the BRAMs are large in quantity, a large number of functional modules inside the network equipment will use them, so that the quantity of the remaining BRAMs is limited, and the use of the large quantity of the BRAMs also brings a series of problems such as increasing the execution difficulty of engineering logics.

Therefore, in order to address the traffic burst problem and reduce the loss of message data in the case of saving the BRAMs, the embodiments of the present disclosure provide a data caching method and apparatus, a medium, and a network equipment.

Reference is now made to FIG. 2, which is a flowchart illustrating a data caching method according to an exemplary embodiment of the present disclosure. The data caching method is applied to network equipment formed based on a programmable logic device, and the network equipment is provided with a first random access memory and a double data rate synchronous dynamic random access memory; referring to FIG. 2, the data caching method comprises the following steps:

S210, receiving message data sent by a second device in response to a read command sent by a first device.

In the embodiment of the present disclosure, the number of the second device may be one or more.

In the embodiment of the present disclosure, the network equipment may receive the message data sent by the second device, i.e., the devices 0 and 1 in FIG. 1, through two Ethernet interfaces CGMAC with a rate of 100 Gbps shown in FIG. 1, so that the bandwidth of the message data received by the network equipment may be 200 Gbps in some cases.

In some implementations, as shown in FIG. 1, the read command may be generated by the central processing unit of the first device and forwarded to the second device through the network equipment.

Not exclusively, in other implementations, the read command may also be generated by the network equipment.

S220, dividing the message data into two paths of data according to a preset strategy, and respectively transmitting the two paths of data to a first random access memory and a double data rate synchronous dynamic random access memory which are configured in a network equipment realized based on a programmable logic device, for storage, wherein a sum of a working bandwidth of the first random access memory and a working bandwidth of the double data rate synchronous dynamic random access memory is greater than or equal to a receiving bandwidth of the message data.

The working bandwidth may be understood as a bandwidth actually used in working, and an effective bandwidth may be understood as a theoretical bandwidth or a designed bandwidth, which refers to a bandwidth that can be used for receiving the message data but is not necessarily used completely, so that the working bandwidth is different from the effective bandwidth.

In the embodiment of the present disclosure, the sum of the working bandwidth of the first random access memory and the working bandwidth of the double data rate synchronous dynamic random access memory is greater than or equal to the receiving bandwidth of the message data, so that the bandwidth requirement for receiving the message data can be met, and the packet loss is avoided.

In the embodiment of the present disclosure, after receiving the message data, the network equipment may distribute the message data according to a preset strategy, that is, divide the message data into two paths of data according to the preset strategy, and further send one of the two paths of data to the first random access memory configured in the network equipment for storage, and send the other of the two paths of data to the double data rate synchronous dynamic random access memory configured in the network equipment for storage, so that the bandwidth of the first random access memory may be used to share the entrance bandwidth pressure of the double data rate synchronous dynamic random access memory, the problem of insufficient receiving bandwidth of the double data rate synchronous dynamic random access memory is solved, and the packet loss possibility of the message data is reduced.

In some implementations, when it is determined that the bandwidth of the received message data is greater than a preset value, the network equipment may divide the message data into two paths of data according to a preset strategy, and respectively send the two paths of data to a first random access memory and a double data rate synchronous dynamic random access memory configured in the network equipment, for storage.

In some implementations, the bandwidth of the received message data being greater than a preset value may be that, the bandwidth of the received message data is greater than the effective bandwidth of the double data rate synchronous dynamic random access memory; with reference to the foregoing example, taking the effective bandwidth of the double data rate synchronous dynamic random access memory being 160 Gbps as an example, when the bandwidth of the received message data is greater than 160 Gbps, for example, 180 Gbps, 200 Gbps, and the like, the network equipment may divide the message data into two paths of data according to a preset strategy, and respectively send the two paths of data to the first random access memory and the double data rate synchronous dynamic random access memory configured in the network equipment for storage.

S230, sending data stored in the first random access memory and data stored in the double data rate synchronous dynamic random access memory to the first device connected with the network equipment.

In the embodiment of the present disclosure, after the two paths of data are respectively sent to the first random access memory and the double data rate synchronous dynamic random access memory configured in the network equipment for storage, the data stored in the first random access memory and the data stored in the double data rate synchronous dynamic random access memory may be subsequently sent to the first device connected with the network equipment.

There may be various ways to send the data stored in the first random access memory and the data stored in the double data rate synchronous dynamic random access memory to the first device.

In some implementations, the stored data may be fetched from the first random access memory and the stored data may be fetched from the double data rate synchronous dynamic random access memory, and then the fetched data are collectively sent to the first device.

In other implementations, the data stored in the first random access memory may be stored in the double data rate synchronous dynamic random access memory, and then the data stored in the double data rate synchronous dynamic random access memory may be fetched and sent to the first device.

Therefore, in this way, the network equipment receives the message data returned by the second device in response to the read command sent by the first device, divides the message data into two paths of data according to the preset strategy, respectively transmits the two paths of data to the first random access memory and the double data rate synchronous dynamic random access memory configured in the network equipment based on a programmable logic device, for storage, and sends the data stored in the first random access memory and the data stored in the double data rate synchronous dynamic random access memory to the first device. By sharing the entrance bandwidth pressure of the double data rate synchronous dynamic random access memory by using the bandwidth of the first random access memory, the problem of insufficient receiving bandwidth of the double data rate synchronous dynamic random access memory is solved, and the packet loss possibility of the message data of the network equipment is reduced.

In addition, considering that the distributed data cannot be directly stored in the double data rate synchronous dynamic random access memory, in some implementations, the dividing the message data into two paths of data according to a preset strategy, and respectively transmitting the two paths of data to a first random access memory and a double data rate synchronous dynamic random access memory configured in a network equipment realized based on a programmable logical device, for storage, may include the following steps:

dividing the message data into the two paths of data according to the preset strategy, sending one of the two paths of data to the first random access memory for storage, and distributing the other of the two paths of data to the double data rate synchronous dynamic random access memory for storage through a first input first output queue.

In the embodiment of the present disclosure, the message data may be stored in the double data rate synchronous dynamic random access memory through a First Input First Output (FIFO) queue.

In addition, if sending the data stored in the first random access memory and the data stored in the double data rate synchronous dynamic random access memory to the first device, is in the manner of storing the data stored in the first random access memory in the double data rate synchronous dynamic random access memory, then fetching and sending the data stored in the double data rate synchronous dynamic random access memory to the first device, and sending the distributed data to the double data rate synchronous dynamic random access memory through the FIFO queue for storage, at this time, it is further considered that reading and writing in the double data rate synchronous dynamic random access memory are mutually exclusive and cannot be made simultaneously, therefore, in order to ensure normal management of the message data, interface arbitration may be set for the double data rate synchronous dynamic random access memory; in this case, in some implementations, the sending data stored in the first random access memory and data stored in the double data rate synchronous dynamic random access memory to a first device connected with the network equipment, may include the following steps:

when a first input first output queue is determined to be empty, storing the data stored in the first random access memory into the double data rate synchronous dynamic random access memory; and when the first input first output queue and the first random access memory are determined to be empty, sending the stored message data to the first device.

In the embodiment of the present disclosure, the first random access memory is used for absorbing burst traffic, and as can be seen from the foregoing, the capacity of the first random access memory is small, and in order to meet a maximum possible capacity of message data to be cached, for example, 128 Mbytes at most, when the first input first output queue is determined to be empty, the data stored in the first random access memory may be stored in the double data rate synchronous dynamic random access memory, to release a space of the first random access memory, and, due to mutual exclusion of reading and writing, the message data stored in the double data rate synchronous dynamic random access memory may be sent to the first device when the first input first output queue and the first random access memory are determined to be empty.

In the embodiment of the present disclosure, three interface commands of the double data rate synchronous dynamic random access memory may be scheduled according to an absolute priority: a first priority is a command to write the data in the first input first output queue into the double data rate synchronous dynamic random access memory; a second priority is a command to write the data in the first random access memory into the double data rate synchronous dynamic random access memory; and a third priority, i.e. the lowest priority, is a command to read a data packet from the double data rate synchronous dynamic random access memory. Therefore, the process of sending the data stored in the first random access memory and the data stored in the double data rate synchronous dynamic random access memory to the first device is realized through the above three interface commands.

In addition, the applicant also found that, in the related art, a memory which is spliced by a plurality of BRAMs and supports an entrance bandwidth greater than 200 Gbps can support low burst resistance. To increase the burst resistance, the BRAMs shall be multiplied.

Exemplarily, by taking an example that the bandwidth of receiving burst message data is 200 Gbps, the cache capacity is 512 KByte, and the write bandwidth of the double data rate synchronous dynamic random access memory is 150 Gbps, 200 BRAMs are spliced to form a memory with a burst capacity capable of absorbing continuous 200 Gbps of 512 KByte/(200G–150G) bps=80 us.

In the embodiment of the present disclosure, taking the first random access memory being the eSRAM with a capacity of 2 MBytes as an example, assuming that there is a bandwidth of 50 Gbps distributed to the eSRAM, the burst resistance is: 2 MBytes/50 Gbps=320 us. Therefore, compared with the memory spliced with 200 BRAMs in the related art, the data caching method of the embodiment of the present disclosure can improve the burst resistance.

There may comprise various ways to divide the message data into two paths of data according to a preset strategy, and respectively transmit the two paths of data to a first random access memory and a double data rate synchronous dynamic random access memory which are configured in a network equipment realized based on a programmable logic device, for storage.

In some implementations, the dividing the message data into two paths of data according to a preset strategy, and respectively transmitting the two paths of data to a first random access memory and a double data rate synchronous dynamic random access memory which are configured in a network equipment realized based on a programmable logic device, for storage, may include the following steps:

for any received frame of message data, splitting the frame of massage data according to a preset ratio, to obtain first slice data of a first data volume and second slice data of a second data volume; and storing the first slice data in the first random access memory, and storing the second slice data in the double data rate synchronous dynamic random access memory.

In the embodiment of the present disclosure, the preset strategy may be a strategy of slicing each received frame of message data, to obtain two paths of slice data corresponding to each frame of message data.

In the embodiment of the present disclosure, each frame of message data received by the network equipment may be split according to a preset ratio, to obtain first slice data of a first data volume and second slice data of a second data volume. Then, the split first slice data can be stored into the first random access memory as one path of data, the second slice data can be stored into the double data rate synchronous dynamic random access memory as the other path of data, so as to complete the process of dividing the message data according to a preset strategy, and transmitting the divided two paths of data to the first random access memory and the double data rate synchronous dynamic random access memory configured in the network equipment for storage.

Exemplarily, assuming that each received frame of message data is 4 KB in size, and the preset ratio is that the data volume of the first slice data and the data volume of the second slice data are 1:3, the first slice data with the size of 1 KB and the second slice data with the size of 3 KB can be obtained by splitting, and the first slice data with the size of 1 KB is stored in the first random access memory and the second slice data with the size of 3 KB is stored in the double data rate synchronous dynamic random access memory, respectively.

In some implementations, the splitting each frame of message data according to a preset ratio may be, splitting from the head of the message, for example, to obtain head slice data with the size of 1 KB as first slice data and obtaining tail slice data with the size of 3 KB as second slice data, or splitting from the tail of the message, for example, to obtain tail slice data with the size of 1 KB as first slice data and obtaining head slice data with the size of 3 KB as second slice data, or splitting from any position of the message data.

In combination with the foregoing, it can be seen that the sending data stored in the first random access memory and data stored in the double data rate synchronous dynamic random access memory to the first device may be, in a manner of storing the data stored in the first random access memory into the double data rate synchronous dynamic random access memory, and then fetching and sending the data stored in the double data rate synchronous dynamic random access memory to the first device, in this case, if the preset strategy is a strategy of slicing each received frame of message data to obtain two paths of slice data corresponding to each frame of message data, in order to conveniently restore each frame of a complete message, in some implementations, same identification information may be added to the first slice data and the second slice data split from a same frame of message data, such that the first slice data and the second slice data split from the same frame of message data carry same identification information. In this case, the sending data stored in the first random access memory and data stored in the double data rate synchronous dynamic random access memory to the first device connected with the network equipment may include the following steps:

storing the first slice data stored in the first random access memory into the double data rate synchronous dynamic random access memory; and sending the first slice data and the second slice data which are stored in the double data rate synchronous dynamic random access memory and correspond to the same identification information to the first device as a frame of complete message data.

In the embodiment of the present disclosure, the first slice data stored in the first random access memory may be stored into the double data rate synchronous dynamic random access memory, and then, when the message data is sent to the first device, the first slice data and the second slice data, which are stored in the double data rate synchronous dynamic random access memory and correspond to the same identification information, may be sent to the first device as a frame of complete message data.

The identification information can also be understood as a descriptor.

It should be noted that some implementations in the embodiment of the present disclosure may be combined in any suitable manner without contradiction.

For example, the step of storing the second slice data into the double data rate synchronous dynamic random access memory may be storing the second slice data into the double data rate synchronous dynamic random access memory through a first input first output queue.

For another example, the step of storing first slice data stored in the first random access memory into the double data rate synchronous dynamic random access memory may be: storing the first slice data stored in the first random access memory into the double data rate synchronous dynamic random access memory when it is determined that the first input first output queue is empty, and sending the first slice data and the second slice data which are stored in the double data rate synchronous dynamic random access memory and correspond to the same identification information to the first device as a frame of message data when it is determined that the first input first output queue and the first random access memory are empty.

In some implementations, when storing the second slice data into the double data rate synchronous dynamic random access memory, a reserved space for storing the first slice data of the same identification information may be reserved beside each stored second slice data, so in the embodiment of the present disclosure, the double data rate synchronous dynamic random access memory includes the reserved spaces, each of the reserved spaces corresponds to a same identification information as the second slice data stored in an adjacent storage space, in which case, the storing the first slice data stored in the first random access memory into the double data rate synchronous dynamic random access memory may include the following steps:

respectively storing each of the first slice data stored in the first random access memory into the reserved space with corresponding identification information.

In the embodiment of the present disclosure, according to the identification information corresponding to the first slice data, the first slice data is stored into the reserved space with the corresponding identification information, so that the message data corresponding to the same frame are close to each other, and data is subsequently fetched at intervals according to the size of each frame of message data, for example, the data is fetched at intervals of 4 KB, so that each frame of complete message data can be fetched, and the difficulty in combining the sliced message data is reduced.

In other implementations, the dividing the message data into two paths of data according to a preset strategy, and respectively transmitting the two paths of data to a first random access memory and a double data rate synchronous dynamic random access memory which are configured in a network equipment realized based on a programmable logic device, for storage, may include the following step:

according to a receiving sequence of the message data, cyclically storing a first number of frames of message data into the first random access memory, and storing a second number of frames of message data into the double data rate synchronous dynamic random access memory, wherein the first number and the second number are determined according to a preset ratio.

In the embodiment of the present disclosure, the preset strategy may also be a strategy of not slicing the received message data, but directly and completely distributing each frame of message data.

In the embodiment of the present disclosure, for the message data received by the network equipment, storing the first number of frames of message data into the first random access memory and storing the second number of frames of message data into the double data rate synchronous dynamic random access memory may be performed cyclically according to the receiving sequence of each frame of message data.

Exemplarily, assuming that the first number of frames is 1 frame and the second number of frames is 3 frames, the first frame of message data received by the network equipment may be stored in the first random access memory, the second, third, and fourth frame of message data received by the network equipment may be stored in the double data rate synchronous dynamic random access memory, the fifth frame of message data received by the network equipment may be stored in the first random access memory, the sixth, seventh, and eighth frame of message data received by the network equipment may be stored in the double data rate synchronous dynamic random access memory, and so on, to complete the process of dividing the message data into two paths of data according to a preset strategy, and respectively transmitting the two paths of data to the first random access memory and the double data rate synchronous dynamic random access memory which are configured in the network equipment realized based on a programmable logic device, for storage.

In some implementations, regardless of the data distribution strategy adopted, the preset ratio involved therein may be determined according to a ratio of the working bandwidth of the first random access memory to the working bandwidth of the double data rate synchronous dynamic random access memory. Therefore, the message data receiving bandwidth can be well adapted, and the data packet loss possibility is reduced.

Exemplarily, assuming that the working bandwidth of the first random access memory is 50 Gbps and the working bandwidth of the double data rate synchronous dynamic random access memory is 150 Gbps, the preset ratio may be set to 1:3.

Figure 3:
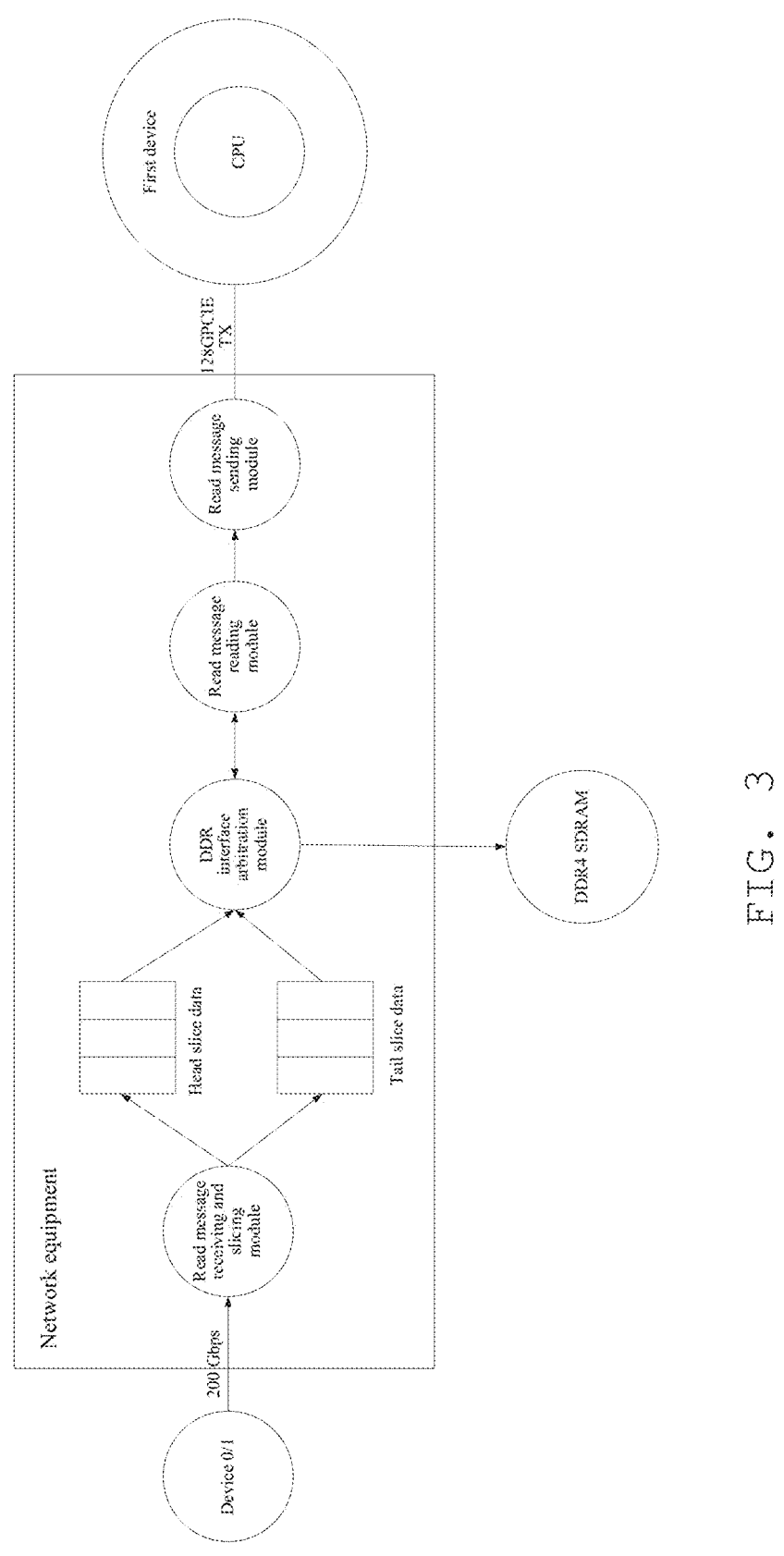
FIG. 3 is a schematic flowchart illustrating a data caching method according to an exemplary embodiment of the present disclosure.

The data caching method according to the embodiment of the present disclosure is described in detail below with reference to a schematic flowchart of a data caching method shown in FIG. 3. In the embodiment of the present disclosure, the bandwidth of message data received by the network equipment is 200 Gbps, the configured first random access memory selects an eSRAM with a capacity of 2 MBytes and an entrance bandwidth of about 60G, the configured double data rate synchronous dynamic random access memory selects a double-data-rate fourth generation synchronous dynamic random access memory (DDR4 SDRAM) with an effective bandwidth of about 160 Gbps, and the DDR4 SDRAM works at a bandwidth of 150 Gbps. The DDR interface arbitration module preferentially schedules the tail slice data, and reads the head slice data in the eSRAM only when the tail slice data FIFO is empty; the lowest priority is, in response to reading messages cached in the DDR4 SDRAM, only when the head slice data and the tail slice data are all emptied, fetching data packets in the DDR4 SDRAM and sending the data packets to the central processing unit of the first device in response to a read data cache command.

A read message receiving and slicing module inside the network equipment receives 200 Gbps message data through two 100 Gbps Ethernet interfaces, wherein each frame of message data is 4K in size.

After receiving the message data, the read message receiving and slicing module distributes each received frame of message data according to the ratio of 1:3, the head slice data of 1 KB is stored in eSRAM, the tail slice data of 3 KB is stored in a first input first output queue, the head slice data and the tail slice data obtained by splitting the same frame of message data carry the same identification information; moreover, the head slice data stored in the eSRAM uses 50 Gbps bandwidth, and the tail slice data stored in the first input first output queue uses 150 Gbps bandwidth. The tail slice data stored in the first input first output queue can be rapidly fetched by the interface arbitration module and stored in the DDR4 SDRAM.

When the first input first output queue is empty, the head slice data in the eSRAM is read through the interface arbitration module and stored in the DDR4 SDRAM. In the DDR4 SDRAM, the location where each frame of the header slice data is cached is determined by the identification information corresponding to the data, that is, each frame of the header slice data is stored in a reserved header space corresponding to the identification information.

When the first input first output queue and the eSRAM are empty, the read message reading module reads corresponding message data from the DDR4 SDRAM through the interface arbitration module according to the read synchronization information, sends the corresponding message data to the read message sending module which finally sends the corresponding message data to the CPU.

With the method of the embodiment of the present disclosure, a message is divided into a head and a tail, which are simultaneously and concurrently sent to a cache, so that the problem of insufficient bandwidth of DDR4 SDRAM is solved by using the eSRAM, and the problem of insufficient capacity of the eRAM is solved by fetching the data of the eRAM and storing the data into a large-capacity DDR4 SDRAM at an idle time of the DDR4 SDRAM.

In addition, in other implementations, after the message data is received by the read message receiving and slicing module, instead of distributing each received frame of message data according to the ratio of 1:3, the received message data may also be distributed in a manner of cyclically storing one message data into the eSRAM and storing 3 message data into the first input first output queue.

Figure 4:
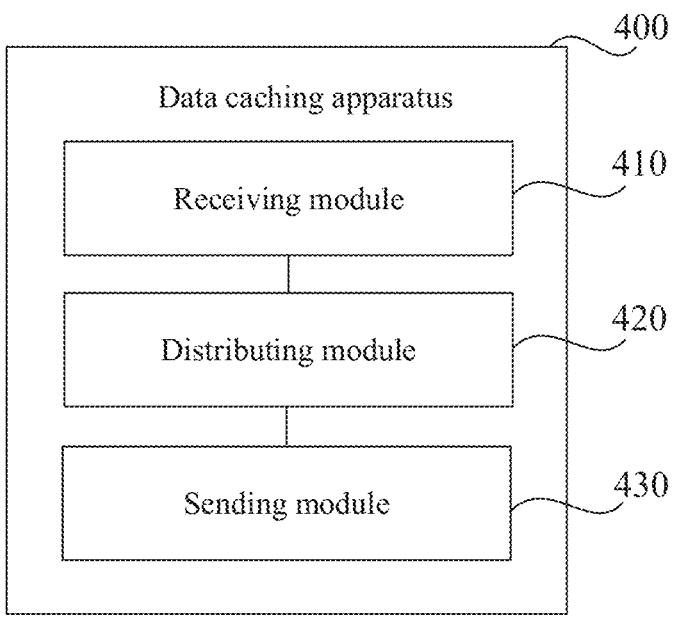
FIG. 4 is a block diagram illustrating a data caching apparatus according to an exemplary embodiment of the present disclosure.

FIG. 4 is a block diagram illustrating a data caching apparatus according to an exemplary embodiment of the present disclosure, and referring to FIG. 4, the data caching apparatus 400 includes:

a receiving module 410, configured to receive message data returned by a second device in response to a read command sent by the first device;

a distributing module 420, configured to divide the message data into two paths of data according to a preset strategy, and respectively transmit the two paths of data to a first random access memory and a double data rate synchronous dynamic random access memory which are configured in a network equipment realized based on a programmable logic device, for storage, wherein a sum of a working bandwidth of the first random access memory and a working bandwidth of the double data rate synchronous dynamic random access memory is greater than or equal to a receiving bandwidth of the message data;

a sending module 430, configured to send data stored in the first random access memory and data stored in the double data rate synchronous dynamic random access memory to the first device connected with the network equipment.

Alternatively, the distributing module 420 includes:

a splitting submodule, configured to, for any received frame of message data, split the frame of massage data according to a preset ratio, to obtain first slice data of a first data volume and second slice data of a second data volume; and a first distributing submodule, configured to store the first slice data into the first random access memory and storing the second slice data into the double data rate synchronous dynamic random access memory.

Alternatively, the first slice data and the second slice data obtained by splitting same one frame of message data carry the same identification information, and the sending module 430 includes:

a first storing submodule, configured to store the first slice data stored in the first random access memory into the double data rate synchronous dynamic random access memory; and a first sending submodule, configured to send the first slice data and the second slice data which are stored in the double data rate synchronous dynamic random access memory and correspond to the same identification information to the first device as a frame of complete message data.

Alternatively, the double data rate synchronous dynamic random access memory includes reserved spaces, each of the reserved spaces corresponds to a same identification information as the second slice data stored in an adjacent storage space, and the first storing submodule includes:

a storing unit, configured to respectively store each of the first slice data stored in the first random access memory into the reserved space with corresponding identification information.

Alternatively, the distributing module 420 includes:

a second distributing submodule, configured to circularly store a first number of frames of message data into the first random access memory, and store a second number of frames of message data into the double data rate synchronous dynamic random access memory according to a receiving sequence of the message data, wherein the first number and the second number are determined according to a preset ratio.

Alternatively, the preset ratio is determined according to a ratio of the working bandwidth of the first random access memory to the working bandwidth of the double data rate synchronous dynamic random access memory.

Alternatively, the distributing module 420 includes:

a third distributing submodule, configured to divide the message data into two paths of data according to the preset strategy, transmit one of the two paths of data to the first random access memory for storage, and distribute the other of the two paths of data to the double data rate synchronous dynamic random access memory for storage through a first input first output queue.

Alternatively, the sending module 430 includes:

a second storing submodule, configured to store the data stored in the first random access memory into the double data rate synchronous dynamic random access memory when the first input first output queue is determined to be empty; and a second sending submodule, configured to send the message data stored in the double data rate synchronous dynamic random access memory to the first device when the first input first output queue and the first random access memory are determined to be empty.

Figure 5:
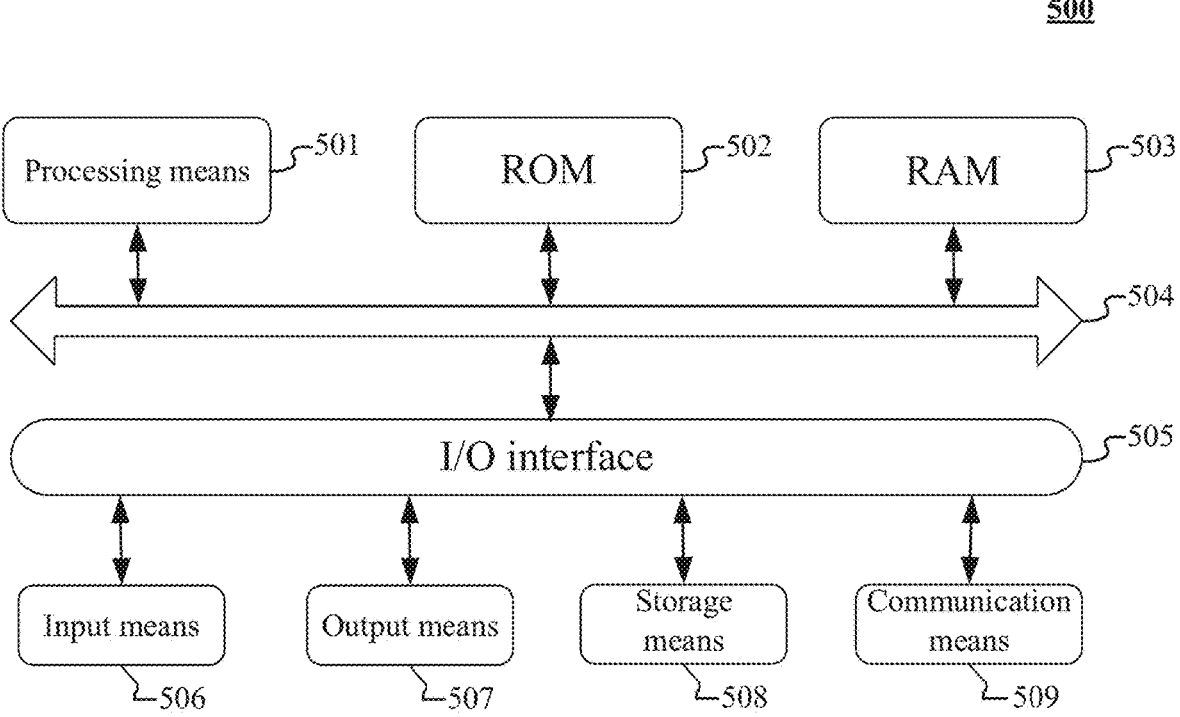
FIG. 5 is a schematic structural diagram illustrating an electronic device according to an exemplary embodiment of the present disclosure.

Reference is now made to FIG. 5, which is a schematic structural diagram illustrating an electronic device 500 suitable for use in implementing the embodiments of the present disclosure. The electronic device shown in FIG. 5 is only an example, and should not bring any limitation to the functions and the scope of use of the embodiments of the present disclosure.

As shown in FIG. 5, the electronic device 500 may include a processing means (e.g., central processing unit, graphics processor, programmable logic device, etc.) 501 that may perform various appropriate actions and processes in accordance with a program stored in a Read Only Memory (ROM) 502 or a program loaded from a storage means 508 into a Random Access Memory (RAM) 503. In the RAM 503, various programs and data necessary for the operation of the electronic apparatus 500 are also stored. The processing means 501, the ROM 502, and the RAM 503 are connected to each other through a bus 504. An input/output (I/O) interface 505 is also connected to the bus 504.

Generally, the following means may be connected to the I/O interface 505: input means 506 including, for example, a touch screen, touch pad, keyboard, camera, mouse, microphone, accelerometer, gyroscope, etc.; output means 507 including, for example, a Liquid Crystal Display (LCD), a speaker, a vibrator, and the like; storage means 508 including, for example, magnetic tape, hard disk, etc.; and a communication means 509. The communication means 509 may allow the electronic device 500 to communicate with other devices wirelessly or by wire to exchange data. While FIG. 5 illustrates an electronic device 500 having various means, it is to be understood that not all illustrated means are required to be implemented or provided. More or fewer means may be alternatively implemented or provided.

In particular, the processes described above with reference to the flowcharts may be implemented as computer software programs, according to the embodiments of the present disclosure. For example, the embodiments of the present disclosure include a computer program product comprising a computer program carried on a non-transitory computer readable medium, the computer program containing program code for performing the method illustrated by the flowchart. In such an embodiment, the computer program may be downloaded and installed from a network via the communication means 509, or installed from the storage means 508, or installed from the ROM 502. The computer program, when executed by the processing means 501, performs the above-described functions defined in the methods of the embodiments of the present disclosure.

It should be noted that the computer readable medium of the present disclosure may be a computer readable signal medium or a computer readable storage medium or any combination of the two. A computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain, or store a program for use by or in connection with an instruction execution system, apparatus, or device. In contrast, in the present disclosure, a computer readable signal medium may include a propagated data signal with computer readable program code embodied therein, for example, in baseband or as part of a carrier wave. Such a propagated data signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to: electrical wires, optical cables, RF (radio frequency), etc., or any suitable combination of the foregoing.

In some implementations, the electronic device may communicate using any currently known or future developed network Protocol, such as HTTP (HyperText Transfer Protocol), and may be interconnected with any form or medium of digital data communication (e.g., a communications network). Examples of communication networks include a local area network ("LAN"), a wide area network ("WAN"), an internet (e.g., the Internet), and peer-to-peer networks (e.g., ad hoc peer-to-peer networks), as well as any currently known or future developed network.

The computer readable medium may be embodied in the electronic device; or may be separate and not assembled into the electronic device.

The computer readable medium carries one or more programs which, when executed by the electronic device, cause the electronic device to:

receive message data returned by a second device in response to a read command sent by a first device; divide the message data into two paths of data according to a preset strategy, transmit one of the two paths of data to a first random access memory for storage, and distribute the other of the two paths of data to a double data rate synchronous dynamic random access memory for storage through a first input first output queue, wherein a sum of a working bandwidth of the first random access memory and a working bandwidth of the double data rate synchronous dynamic random access memory is greater than or equal to a receiving bandwidth of the message data; and send data stored in the first random access memory and data stored in the double data rate synchronous dynamic random access memory to the first device connected with the network equipment.

Computer program code for carrying out operations of the present disclosure may be written in one or more programming languages or any combination thereof, including but not limited to an object oriented programming language such as Java, Smalltalk, C++, and including conventional procedural programming languages, such as the "C" language or similar programming languages. The program code may execute entirely on a user's computer, partly on a user's computer, as a stand-alone software package, partly on a user's computer and partly on a remote computer, or entirely on a remote computer or a server. In the scenario where a remote computer is involved, the remote computer may be connected to the user's computer through any type of network, including a Local Area Network (LAN) or a Wide Area Network (WAN), or the connection may be made to an external computer (for example, through the Internet using an Internet service provider).

The flowchart and block diagrams in the drawings illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the drawings. For example, two blocks shown in succession may, in fact, be executed substantially concurrently, or the blocks may sometimes be executed in a reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The modules described in the embodiments of the present disclosure may be implemented by software or hardware, wherein the name of a module does not in some cases constitute a limitation on the module itself.

The functions described herein above may be performed, at least in part, by one or more hardware logic components. For example, without limitation, exemplary types of hardware logic components that may be used include: field Programmable Gate Arrays (FPGAS), Application Specific Integrated Circuits (ASICs), Application Specific Standard Products (ASSPs), system on a chip (SOCs), Complex Programmable Logic Devices (CPLDs), and the like.

The present disclosure also provides a computer readable storage medium having computer program instructions stored thereon, which, when executed by a processor, implement the steps of the data caching method according to the embodiments of the present disclosure.

The present disclosure also provides a programmable logic device, comprising a processing means and an interface; the processing means configured to read instructions to execute the steps of the data caching method according to the embodiment of the present disclosure.

The present disclosure also provides an electronic device comprising the programmable logic device according to the embodiment of the present disclosure.

In the context of the present disclosure, a machine-readable medium may be a tangible medium that can contain, or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection based on one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The foregoing only describes the preferred embodiments of the present disclosure and the technical principles employed. It should be appreciated by those skilled in the art that the disclosure scope involved in the present disclosure is not limited to the technical solutions formed by specific combinations of the technical features described above, but also encompasses other technical solutions formed by arbitrary combinations of the above technical features or equivalent features thereof without departing from the above disclosed concepts, for example, a technical solution formed by performing mutual replacement between the above features and technical features having similar functions to those disclosed (but not limited to) in the present disclosure.

Furthermore, while operations are depicted in a specific order, this should not be understood as requiring that these operations be performed in the specific order shown or in a sequential order. Under certain circumstances, multitasking and parallel processing might be advantageous. Similarly, while several specific implementation details are included in the above discussion, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or method logical actions, it should be understood that the subject matter defined in the attached claims is not necessarily limited to the specific features or actions described above. Rather, the specific features and actions described above are only example forms of implementing the claims. With regard to the apparatus in the above embodiments, specific manners in which each module performs its operation have been described in detail in the embodiments related to the method, and thus will not be described in detail here.

The invention claimed is:

1. A data caching method, comprising:
   receiving message data returned by a second device in response to a read command sent by a first device;
   dividing the message data into two paths of data according to a preset strategy, and respectively transmitting the two paths of data to a first random access memory and a double data rate synchronous dynamic random access memory which are configured in a network equipment realized based on a programmable logic device, for storage, wherein a sum of a working bandwidth of the first random access memory and a working bandwidth of the double data rate synchronous dynamic random access memory is greater than or equal to a receiving bandwidth of the message data; and
   sending data stored in the first random access memory and data stored in the double data rate synchronous dynamic random access memory to the first device connected with the network equipment.

2. The method according to claim 1, wherein, the dividing the message data into two paths of data according to a preset strategy, and respectively transmitting the two paths of data to a first random access memory and a double data rate synchronous dynamic random access memory which are configured in a network equipment realized based on a programmable logic device, for storage, comprises:

for any received frame of message data, splitting the frame of massage data according to a preset ratio, to obtain first slice data of a first data volume and second slice data of a second data volume; and storing the first slice data in the first random access memory, and storing the second slice data in the double data rate synchronous dynamic random access memory.

3. The method according to claim 2, wherein, the first slice data and the second slice data split from a same frame of message data carry same identification information, and the sending data stored in the first random access memory and data stored in the double data rate synchronous dynamic random access memory to the first device connected with the network equipment, comprises:

storing the first slice data stored in the first random access memory into the double data rate synchronous dynamic random access memory; and sending the first slice data and the second slice data which are stored in the double data rate synchronous dynamic random access memory and correspond to a same identification information to the first device as a frame of complete message data.

4. The method according to claim 3, wherein, the double data rate synchronous dynamic random access memory comprises reserved spaces, each of the reserved spaces corresponds to a same identification information as the second slice data stored in an adjacent storage space, and the storing the first slice data stored in the first random access memory into the double data rate synchronous dynamic random access memory, comprises:

respectively storing each of the first slice data stored in the first random access memory into the reserved space with corresponding identification information.

5. The method according to claim 1, wherein, the dividing the message data into two paths of data according to a preset strategy, and respectively transmitting the two paths of data to a first random access memory and a double data rate synchronous dynamic random access memory which are configured in a network equipment realized based on a programmable logic device, for storage, comprises:

circularly storing a first number of frames of message data into the first random access memory, and storing a second number of frames of message data into the double data rate synchronous dynamic random access memory according to a receiving sequence of the message data, wherein the first number and the second number are determined according to a preset ratio.

6. The method according to claim 2, wherein, the preset ratio is determined according to a ratio of the working bandwidth of the first random access memory to the working bandwidth of the double data rate synchronous dynamic random access memory.

7. The method according to claim 1, wherein, the dividing the message data into two paths of data according to a preset strategy, and respectively transmitting the two paths of data to a first random access memory and a double data rate synchronous dynamic random access memory which are configured in a network equipment realized based on a programmable logic device, for storage, comprises:

dividing the message data into the two paths of data according to the preset strategy, sending one of the two paths of data to the first random access memory for storage, and distributing the other of the two paths of data to the double data rate synchronous dynamic random access memory for storage through a first input first output queue.

8. The method according to claim 7, wherein, the sending data stored in the first random access memory and data stored in the double data rate synchronous dynamic random access memory to the first device connected with the network equipment, comprises:

storing the data stored in the first random access memory into the double data rate synchronous dynamic random access memory when it is determined that the first input first output queue is empty, and sending the message data stored in the double data rate synchronous dynamic random access memory to the first device when it is determined that the first input first output queue and the first random access memory are empty.

9. A non-transitory computer readable medium having stored thereon a computer program which, when executed by a processing means, performs the following steps:

receiving message data returned by a second device in response to a read command sent by a first device;

dividing the message data into two paths of data according to a preset strategy, and respectively transmitting the two paths of data to a first random access memory and a double data rate synchronous dynamic random access memory which are configured in a network equipment realized based on a programmable logic device, for storage, wherein a sum of a working bandwidth of the first random access memory and a working bandwidth of the double data rate synchronous dynamic random access memory is greater than or equal to a receiving bandwidth of the message data; and sending data stored in the first random access memory and data stored in the double data rate synchronous dynamic random access memory to the first device connected with the network equipment.

10. The non-transitory computer readable medium according to claim 9, wherein, the dividing the message data into two paths of data according to a preset strategy, and respectively transmitting the two paths of data to a first random access memory and a double data rate synchronous dynamic random access memory which are configured in a network equipment realized based on a programmable logic device, for storage, comprises:

for any received frame of message data, splitting the frame of massage data according to a preset ratio, to obtain first slice data of a first data volume and second slice data of a second data volume; and storing the first slice data in the first random access memory, and storing the second slice data in the double data rate synchronous dynamic random access memory.

11. The non-transitory computer readable medium according to claim 10, wherein, the first slice data and the second slice data split from a same frame of message data carry same identification information, and the sending data stored in the first random access memory and data stored in the double data rate synchronous dynamic random access memory to the first device connected with the network equipment, comprises:

storing the first slice data stored in the first random access memory into the double data rate synchronous dynamic random access memory; and sending the first slice data and the second slice data which are stored in the double data rate synchronous dynamic random access memory and correspond to a same identification information to the first device as a frame of complete message data.

12. The non-transitory computer readable medium according to claim 10, wherein, the preset ratio is determined according to a ratio of the working bandwidth of the first random access memory to the working bandwidth of the double data rate synchronous dynamic random access memory.

13. The non-transitory computer readable medium according to claim 11, wherein, the double data rate synchronous dynamic random access memory comprises reserved spaces, each of the reserved spaces corresponds to a same identification information as the second slice data stored in an adjacent storage space, and the storing the first slice data stored in the first random access memory into the double data rate synchronous dynamic random access memory, comprises:

respectively storing each of the first slice data stored in the first random access memory into the reserved space with corresponding identification information.

14. The non-transitory computer readable medium according to claim 9, wherein, the dividing the message data into two paths of data according to a preset strategy, and respectively transmitting the two paths of data to a first random access memory and a double data rate synchronous dynamic random access memory which are configured in a network equipment realized based on a programmable logic device, for storage, comprises:

circularly storing a first number of frames of message data into the first random access memory, and storing a second number of frames of message data into the double data rate synchronous dynamic random access memory according to a receiving sequence of the message data, wherein the first number and the second number are determined according to a preset ratio.

15. A network equipment, comprising a processing means and an interface; the processing means configured to read instructions to perform the following steps:

receiving message data returned by a second device in response to a read command sent by a first device;

dividing the message data into two paths of data according to a preset strategy, and respectively transmitting the two paths of data to a first random access memory and a double data rate synchronous dynamic random access memory which are configured in the network equipment realized based on a programmable logic device, for storage, wherein a sum of a working bandwidth of the first random access memory and a working bandwidth of the double data rate synchronous dynamic random access memory is greater than or equal to a receiving bandwidth of the message data; and sending data stored in the first random access memory and data stored in the double data rate synchronous dynamic random access memory to the first device connected with the network equipment.

16. The network equipment according to claim 15, wherein, the dividing the message data into two paths of data according to a preset strategy, and respectively transmitting the two paths of data to a first random access memory and a double data rate synchronous dynamic random access memory which are configured in the network equipment realized based on a programmable logic device, for storage, comprises:

for any received frame of message data, splitting the frame of massage data according to a preset ratio, to obtain first slice data of a first data volume and second slice data of a second data volume; and storing the first slice data in the first random access memory, and storing the second slice data in the double data rate synchronous dynamic random access memory.

17. The network equipment according to claim 16, wherein, the first slice data and the second slice data split from a same frame of message data carry same identification information, and the sending data stored in the first random access memory and data stored in the double data rate synchronous dynamic random access memory to the first device connected with the network equipment, comprises:

storing the first slice data stored in the first random access memory into the double data rate synchronous dynamic random access memory; and sending the first slice data and the second slice data which are stored in the double data rate synchronous dynamic random access memory and correspond to a same identification information to the first device as a frame of complete message data.

18. The network equipment according to claim 16, wherein, the preset ratio is determined according to a ratio of the working bandwidth of the first random access memory to the working bandwidth of the double data rate synchronous dynamic random access memory.

19. The network equipment according to claim 17, wherein, the double data rate synchronous dynamic random access memory comprises reserved spaces, each of the reserved spaces corresponds to a same identification information as the second slice data stored in an adjacent storage space, and the storing the first slice data stored in the first random access memory into the double data rate synchronous dynamic random access memory, comprises:

respectively storing each of the first slice data stored in the first random access memory into the reserved space with corresponding identification information.

20. The network equipment according to claim 15, wherein, the dividing the message data into two paths of data according to a preset strategy, and respectively transmitting the two paths of data to a first random access memory and a double data rate synchronous dynamic random access memory which are configured in the network equipment realized based on a programmable logic device, for storage, comprises:

circularly storing a first number of frames of message data into the first random access memory, and storing a second number of frames of message data into the double data rate synchronous dynamic random access memory according to a receiving sequence of the message data, wherein the first number and the second number are determined according to a preset ratio.

* * * * *